United States Patent
Yasui et al.

(10) Patent No.: US 7,502,681 B2
(45) Date of Patent: Mar. 10, 2009

(54) PLANT CONTROL DEVICE AND CONTROL METHOD USING MODULATION ALGORITHM

(75) Inventors: Yuji Yasui, Saitama (JP); Kanako Shimojo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 10/593,641

(22) PCT Filed: Mar. 17, 2005

(86) PCT No.: PCT/JP2005/004792

§ 371 (c)(1),
(2), (4) Date: Jun. 22, 2007

(87) PCT Pub. No.: WO2005/091088

PCT Pub. Date: Sep. 29, 2005

(65) Prior Publication Data

US 2008/0059042 A1 Mar. 6, 2008

(30) Foreign Application Priority Data

Mar. 23, 2004 (JP) .............................. 2004-083859

(51) Int. Cl.
*F02D 28/00* (2006.01)
(52) U.S. Cl. .................................................. 701/102
(58) Field of Classification Search .................. 701/102, 701/103–105, 115, 99; 123/90.17; 73/117.3
See application file for complete search history.

(56) References Cited

U.S. PATENT DOCUMENTS

| | | | |
|---|---|---|---|
| 5,325,711 A * | 7/1994 | Hamburg et al. | .......... 73/114.73 |
| 5,574,455 A | 11/1996 | Hori et al. | |
| 6,859,717 B2 * | 2/2005 | Yasui et al. | ..................... 701/99 |
| 7,316,212 B2 * | 1/2008 | Tagami et al. | ............. 123/90.17 |
| 2001/0026234 A1 | 10/2001 | Nakao et al. | |
| 2003/0125865 A1 | 7/2003 | Yasui | |
| 2003/0154953 A1 | 8/2003 | Yasui | |

FOREIGN PATENT DOCUMENTS

| | | |
|---|---|---|
| JP | 07-212234 A | 8/1995 |
| JP | 2001-332973 A | 11/2001 |
| JP | 2003-195908 A | 7/2003 |
| JP | 2003-241803 A | 8/2003 |

* cited by examiner

*Primary Examiner*—Hieu T Vo
(74) *Attorney, Agent, or Firm*—Arent Fox LLP

(57) ABSTRACT

There is provided a control method for sufficiently compensating the non-linear characteristic for a plant having a strong non-linear characteristic and satisfying the follow-up and stability for a plant having a large control amount fluctuation. There is provided a plant control device using modulation algorithm. The control device includes: means for calculating a temporary control input for controlling the plant output to a target value; means for dividing the temporary control input into a plurality of components; means for modulating at least one of the components; and means for adding the modulated component to another component so as to generate a control input. Thus, it is possible to minimize the input fluctuation caused by modulation while maintaining the compensation ability of the non-linear characteristic such as plant friction and hysteresis attributed to the conventional modulation algorithm. Accordingly, even in a plant in which the temporary control input is greatly changed, it is possible to prevent oscillation of the output, thereby improving the controllability.

12 Claims, 10 Drawing Sheets

PLANT CONTROL DEVICE AND CONTROL METHOD USING MODULATION ALGORITHM

CROSS-REFERENCE TO RELATED APPLICATION

This application is a National Stage entry of International Application No. PCT/JP2005/004792, filed Mar. 17, 2005, the entire specification, claims and drawings of which are incorporated herewith by reference.

TECHNICAL FIELD

The present invention relates to a feedback control technique for a plant and, more particularly, it relates to a control of a variable lift mechanism and a variable phase mechanism, and also to an air/fuel ratio control for an internal-combustion engine.

BACKGROUND OF THE INVENTION

When a plant has a strong nonlinear property, a high precision control cannot readily be realized because of tracking and/or stability problems when a general linear feedback controller such as PD, PID or the like is used. For example, as for a variable lift mechanism of an engine, a high precision feedback control cannot readily be realized because the variable lift mechanism has a large friction and a nonlinear property such as a hysteresis characteristic against an increase/decrease of the lift amount. Similarly, a variable phase mechanism and/or an air/fuel ratio control mechanism for an engine and an actuator control mechanism of an automatic transmission have strong nonlinearity.

Because the engine control depends on realization of high precision operations of each of multiple components of the engine, a high precision in stability of behavior and tracking capability is required for the components having a strong nonlinearity such as described above. Thus, there is a need for a control technique for a plant having a strong nonlinear property.

For example, the Japanese Patent Application Publication No. 2001-152885 discloses a control technique using a sliding mode controller in which a dither input is added. This control technique uses the dither input to correct a controlled variable that is calculated from the sliding mode controller to perform a feedback control of the plant toward a desired value. Through this process, a decrease in the controllability, which may be caused by the nonlinear property of the plant such as the friction property or the like, can be compensated.

According to the above technique, however, only a dither input having predetermined amplitude is added to the controlled variable when a switching function of the sliding mode controller exceeds a threshold value. In other words, when the plant approaches to the desired value (when the switching function is below the threshold value), the addition of the dither input is suspended, so the control becomes equivalent to the usual feedback control. For this reason, tracking delay and occurrence of a steady-state deviation are not prevented although behaviors during the feedback control are smoothed out. Besides, if the dither is added and the amplitude of the dither signal is set to be larger even when the switching function is below the threshold value in order to resolve the above-described problem, vibration may occur around the desired value.

A similar control technique, a $\Delta\Sigma$ modulation algorithm is commonly known (for example, refer to the Japanese Patent Application Publication No. 2003-195908). This technique uses, as a control input, a modulation signal that is a binary signal converted from a reference input signal from a controller. According to this technique, as long as a plant is capable of reproducing on/off inputs, a nonlinear property can be compensated to make a precise control of the output of the plant regardless of the degree of its responsiveness.

However, in order to realize high controllability over the whole range of the reference input signal generated by the controller, the modulation signal is required to have a larger variation range than the reference input. As a result, in case of a plant such as a variable lift mechanism in which the variation range of the reference input is larger and the speed of the variation is faster, the absolute value of the generated modulation signal may become larger. In such case, even for the stable desired value, the control input may vibrate and accordingly the output of the plant may vibrate.

DISCLOSURE OF THE INVENTION

Problem to be Solved by the Invention

Although there have been proposed some conventional control techniques for compensating for a nonlinear property of a plant, there still exists a reliability problem in applying those techniques to a plant having a strong nonlinear property. In particular, a technique for realizing a high precision control is needed for a plant in which a variation of a controlled variable is larger.

Therefore, it is an objective of the present invention to provide a control technique that sufficiently compensates for a nonlinear property of a plant having a strong nonlinear property and also to satisfy tracking capability and stability of a plant with controlled variables having a large variation.

SUMMARY OF THE INVENTION

The present invention provides a plant controller using a modulation algorithm. The controller has means for calculating a preliminary control input to be used for controlling an output of the plant to a desired value, means for dividing the preliminary control input into a plurality of components, means for modulating at least one of the plurality of components and means for adding the modulated component to the other components so as to generate a control input. According to the present invention, input variations caused by the modulation can be minimized while maintaining the compensation capability of conventional modulation algorithms upon the nonlinear property of the plant such as friction and/or hysteresis property. Accordingly, even for the plant in which the preliminary input significantly changes, the vibration of the output can be prevented, resulting in improvement of controllability.

According to one aspect of the present invention, the components divided from the preliminary control input include a first component that is calculated by filtering the preliminary input and a second component that is within a range of a predetermined absolute value of a difference between the preliminary control input and the first component. The second component is modulated. According to this aspect of the invention, while the responsiveness that can be realized by the preliminary control input is maintained, compensation capability of conventional modulation algorithms for the nonlinear property can be additionally provided. Because the amplitude of the component to be modulated is minimized, the control resolution is enhanced to suppress small vibration of the output, resulting in an enhanced controllability.

According to another aspect of the present invention, the filtering is performed by a linear filter or a median filter. According to this aspect of the invention, when the preliminary control input exhibits impulse-like behaviors and/or fluctuation behaviors, these behaviors can be sufficiently excluded, so that deterioration of stability and/or controllability of the control system can be prevented.

According to a further aspect of the present invention, the filtering is performed by a $\epsilon$ filter. According to this aspect of the invention, when the preliminary control input exhibits fluctuation behaviors, such behaviors can be sufficiently excluded, so that deterioration of stability and/or controllability of the control system can be prevented.

When the preliminary control input significantly changes in a step shape, such behavior can be preserved, improving tracking capability of the control system.

According to yet further aspect of the present invention, the controller using a modulation algorithm can be used for a variable lift mechanism, a variable phase mechanism or an air/fuel ratio control of an engine or an automatic transmission mechanism. According to this aspect of the invention, the control precision can be improved.

DESCRIPTION OF THE PREFERRED EMBODIMENTS

Preferred embodiments of the present invention will now be described with reference to the accompanying drawings.

1. A Variable Lift Mechanism Control Technique in Accordance with One Embodiment of the Present Invention A modulation algorithm such as a $\Delta\Sigma$ modulation or the like has a strong compensation capability against certain nonlinear property such as a hysteresis characteristic, a friction property or the like of a controlled object. However, when the variation range of the input signal is large and variation speed is high, there is a problem that a control signal containing certain vibration may be output. There is a need for a control technique that is capable of utilizing a nonlinearity compensation effect of the $\Delta\Sigma$ modulation algorithm even for a controlled object having an input that has a significant variation.

In one embodiment of the present invention, the controlled object is a variable lift mechanism of an engine. The variable lift mechanism is composed of a cam, a lift variable link, an upper link and a lower link. This mechanism has a function of adjusting a maximum lift amount of a valve by changing an angle of the lower link with an actuator or the like. The maximum lift amount of the valve is determined in accordance with an operating condition of the engine and/or a requested driving force. In case of the variable lift mechanism, a variation range of a reference input by a controller is large, that is, ±10V, and a variation speed is high. In order to compensate for such variation range, a modulation signal needs to be larger than the variation range of the reference input. If so, the control precision may deteriorate because the controlled variable vibrates.

In the present embodiment of the invention, in order to resolve this problem, a bypass type of $\Delta\Sigma$ modulation algorithm is applied to the variable lift mechanism control. Detailed description will follow.

1. 1 Outline of a Bypass Type of $\Delta\Sigma$ Modulation Algorithm

Figure 1:
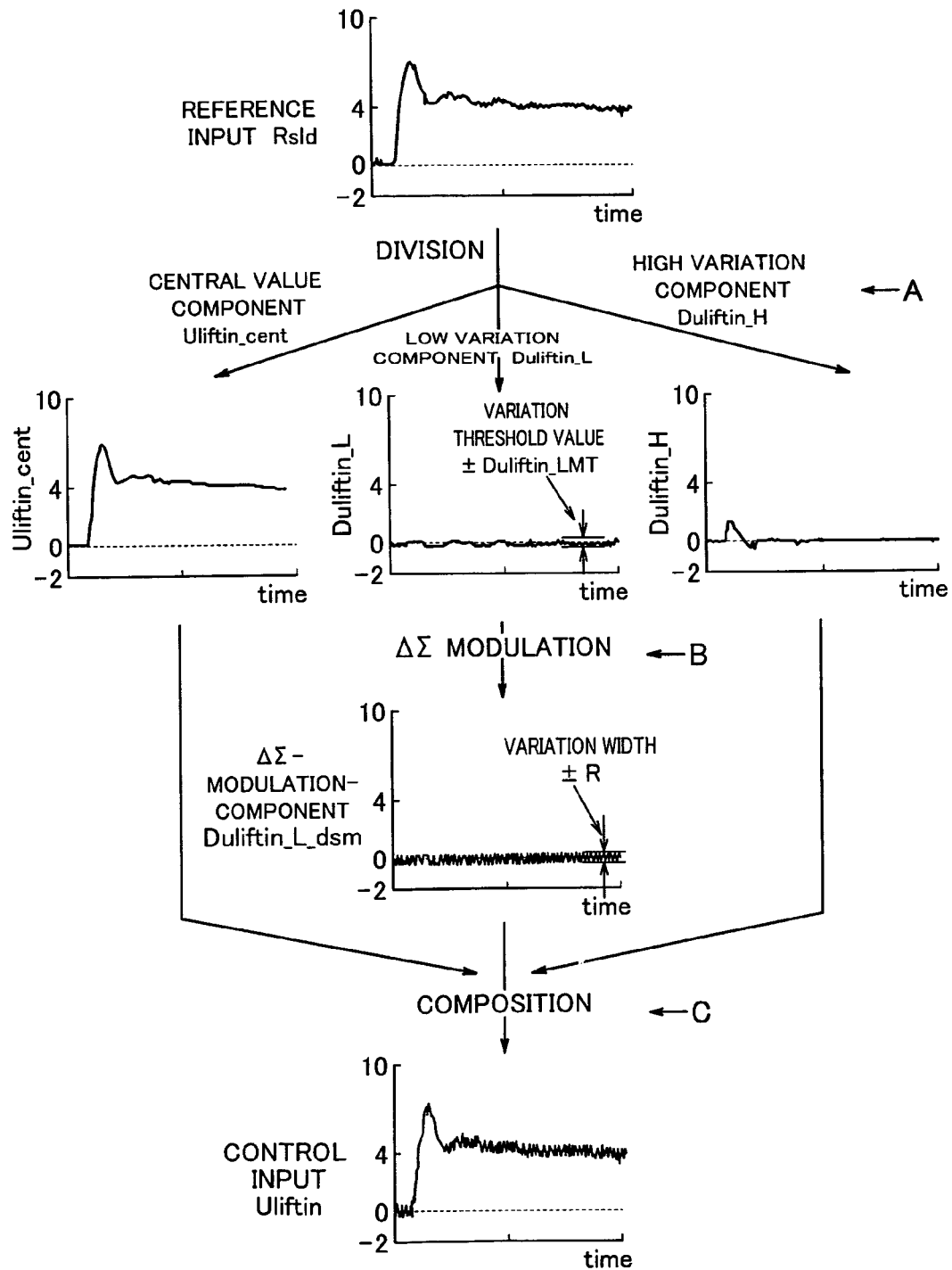
FIG. 1 is a block diagram of a bypass type $\Delta\Sigma$ modulation algorithm in accordance with one embodiment of the present invention.

FIG. 1 is a block diagram of a bypass type of $\Delta\Sigma$ modulation algorithm. Referring to FIG. 1, the bypass type of $\Delta\Sigma$ modulation algorithm first divides a reference input Rsld from a controller into three component as shown in Equation (1) (refer to "A" in FIG. 1).

$$Rsld(k) = Uliftin\_cent(k) + Duliftin\_L(k) + Duliftin\_H(k) \quad (1)$$

In Equation (1), Uliftin_cent(k) represents a central value component in the variation range of the reference input, Duliftin_L(k) represents a low variation component that is a variation within a predetermined range from the center value component Uliftin_cent(k). Duliftin_H(k) represents a high variation component that is a variation exceeding the predetermined range from Uliftin_cent(k).

Only the low variation component Duliftin_L(k) is modulated by the $\Delta\Sigma$ modulation algorithm to obtain a modulated component Duliftin_L_dsm(k) (refer to "B" in FIG. 1). Subsequently, the modulated component Duliftin_L_dsm(k) and the other components are re-composed as shown in Equation (2) to obtain a control input Uliftin(k) (refer to "C" in FIG. 1).

$$Uliftin(k) = Uliftin\_cent(k) + Duliftin\_L\_dsm(k) + Duliftin\_H(k) \quad (2)$$

Thus, a small amplitude $\Delta\Sigma$-modulated signal in accordance with a global behavior of the reference input Rsld is generated as a control input. According to this approach, the component having a large variation in the control signal is first preserved as it is, and only the signal component having amplitude within the predetermined range is $\Delta\Sigma$-modulated. Therefore, this approach compensate for the nonlinear property, which is a characteristic of the $\Delta\Sigma$ modulation algorithm and is capable of generating a control signal of a suppressed vibration.

Now, calculation methods of the above-described three divided components will be described.

1. 2 Calculation of the Center Value Component Uliftin_cent

The center value component Uliftin_cent of the reference input Rsld from the controller is required not to follow impulse-like behaviors and/or small amplitude variations of the reference input (condition 1) and to follow large variations such as step-shaped waveforms of the reference input (condition 2). The condition 1 is required for enhancing the convergence capability of the control and the condition 2 is required for enhancing the tracking capability of the control.

Since the condition 1 and the condition 2 contradict each other, both conditions cannot be satisfied simultaneously by commonly-used linear filters. If high frequency components such as impulse-like waveforms and/or small vibrations are removed by a commonly-used linear filter (condition 1), the step-shaped waveforms or the like may be smoothed out together. On the other hand, if the large variations such as the step-shaped waveforms or the like are preserved (condition 2), high frequency components may be removed only incompletely.

Figure 2:
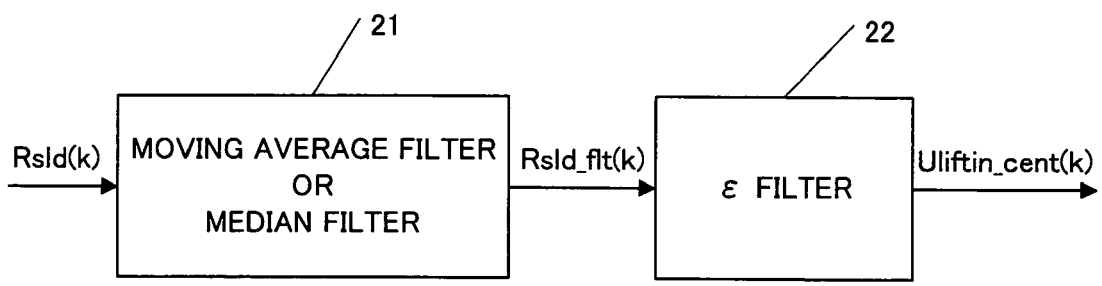
FIG. 2 is a block diagram of a nonlinear filter that is applied in one embodiment of the present invention.

Therefore, in one embodiment of the present invention, a nonlinear filter that is formed by a combination of multiple filters is applied to extract the desired center value component Uliftin_cent. FIG. 2 shows a block diagram of a nonlinear filter 20 that is applied in one embodiment of the present invention. The nonlinear filter 20 of this embodiment uses a filter 21 selected from a group comprising a moving average filter and a median filter in combination with a $\epsilon$ filter 22.

The moving average filter is a filter for calculating an average of a predetermined number of data so as to smooth out high frequency components such as impulse-like waveforms and/or small vibrations. Referring to FIG. 2, this filter calculates an average Rsld_flt(k) by using the m+1 data from the current input signal Rsld(k) through the past input signal Rsld(k−m) that is a signal before m steps from the current step. The moving average filter is generally expressed as in Equation (3).

$$\text{Rsld\_flt}(k) = \frac{1}{m+1} \sum_{i=0}^{m} \text{Rsld}(k-i) \quad (3)$$

The moving average filter is a typical linear filter. Any other linear filter such as a low-pass filter may be used alternatively.

The median filter is a filter for selecting a center value from a predetermined number of data. The median filter is one type of nonlinear filter to smooth out high frequency components such as impulse-like waveforms and/or small vibrations. When the median filter performs a smoothing process upon the step-shaped waveforms or the like, it produces less deformation in comparison with linear filters. The median filter is generally expressed as in Equation (4).

$$\text{Rsld\_flt}(k) = F_{med}(\text{Rsld}(k), \text{Rsld}(k-1), \ldots, \text{Rsld}(k-2m')) \quad (4)$$

In Equation (4), Fmed represents a function for extracting a center value out of (2m'+1) input data. (2m'+1) is an odd number. The center value is the m'-th value. When (2m'+1) is an even number, either the m'-th value or the (m'+1)-th value may be selected as a center value or an average of those two values may be selected as a center value.

The $\epsilon$ filter is a nonlinear filter having a characteristic that an input signal is output as it is in a transient state and a moving average is output in a stationary state. The $\epsilon$ filter basically calculates a moving average by using the n+1 data of the current input Rsld_flt(k) through the past input Rsld_flt(k−n) that is an input n steps before the current step. However, the data that are outside of a predetermined range $\epsilon$ from the current input Rsld_flt(k) are replaced by Rsld_flt(k). In other words, the $\epsilon$ filter is a moving average filter having an effect of a nonlinear function $F_\epsilon$. The $\epsilon$ filter is generally expressed as in Equation (5).

$$\text{Uliftin\_cent}(k) = \frac{1}{n+1} \sum_{j=0}^{n} F\epsilon(\text{Rsld\_flt}(k-j), \text{Rsld\_flt}(k)) \quad (5)$$

The nonlinear function F$\epsilon$ is defined as in Equation (6).

$$F\epsilon(X, Y) = \begin{cases} X & (Y - \varepsilon \leq X \leq Y + \varepsilon) \\ Y & (X < Y - \varepsilon, Y + \varepsilon < X) \end{cases} \quad (6)$$

Use of such $\epsilon$ filter serves to reduce fluctuations in the stationary state and to suppress phase delays in the transient state.

Figure 3:
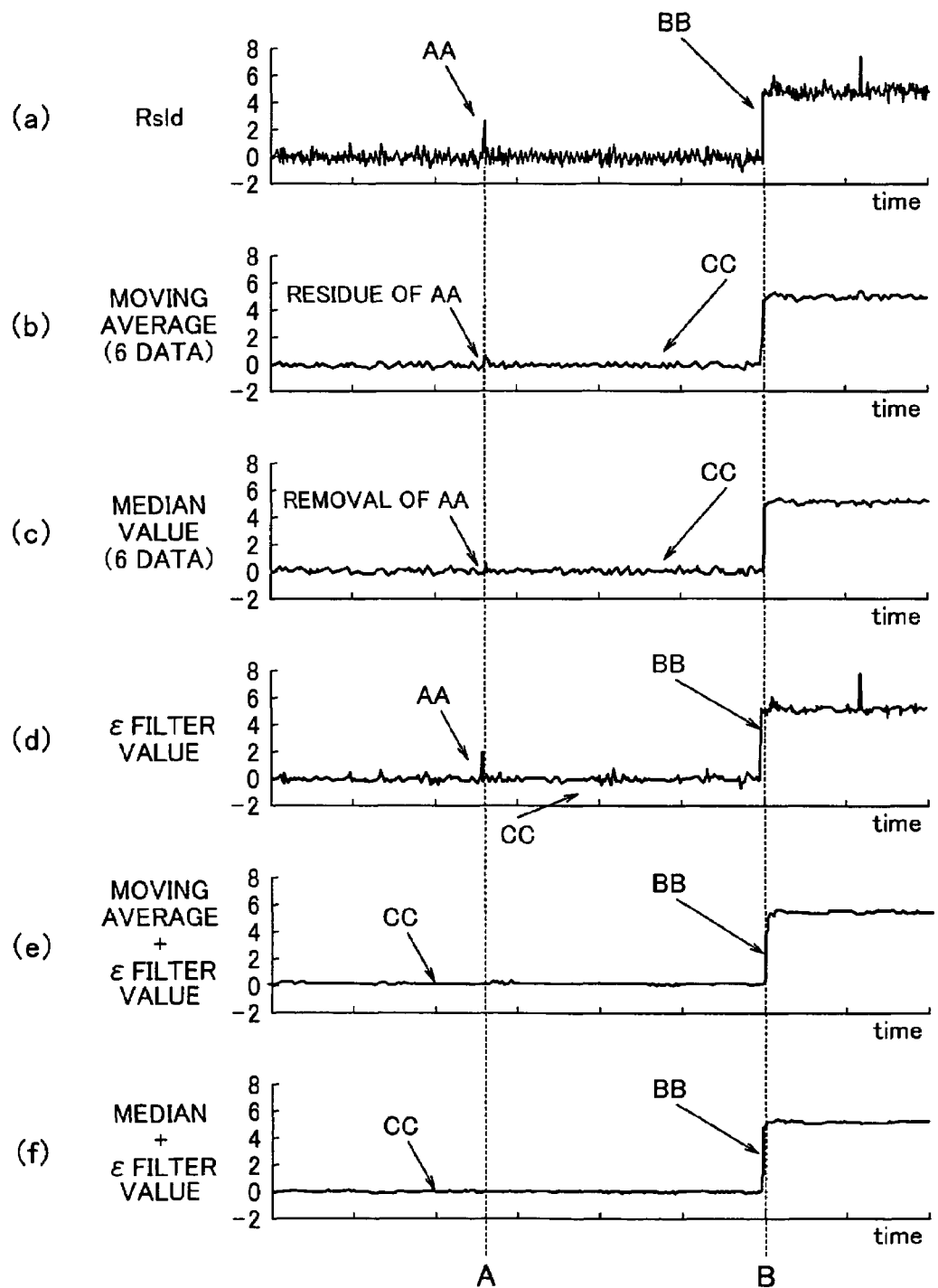
FIG. 3 schematically shows results of filtering processes upon a reference input by each filter.

FIG. 3 shows performance comparison of the filters in terms of extraction of the center value component from the reference input. FIG. 3(a) shows a reference input Rsld from the controller. FIGS. 3(b) through (d) show the output of the above-described three types (moving average, median and $\epsilon$) of filters. Only one type of filter is used in each case. FIG. 3(e) shows an output of a nonlinear filter 20, a combination of the moving average filter and the $\epsilon$ filter. FIG. 3(f) shows an output of another nonlinear filter 20, a combination of the median filter and the $\epsilon$ filter.

In FIG. 3, six data are used in each of the moving average filter, the median filter, and the $\epsilon$ filter is 6.

The result of each filtering process is as follows. The following description focuses on impulse-like behavior (AA in FIG. 3) and step-shaped behavior (BB in FIG. 3). Both behaviors are included in the reference input Rsld.

When the moving average filter is used for the filtering process (FIG. 3(b)), impulse-like behavior of the reference input Rsld is suppressed although not completely (residue of AA in FIG. 3(b)) and step-shaped behavior is maintained. However, there is certain influence of small amplitude variation (CC in FIG. 3(b)). In order to reduce such influence, the number of the data to be used for the moving average calculation needs to be increased. As the number of data is increased, the capability to track the step-shaped behavior may deteriorate.

When the median filter is used for the filtering process (FIG. 3(c)), the impulse-like behavior of the reference input Rsld is removed and the step-shaped behavior is satisfactorily tracked. However, the capability of suppressing the influence of the small amplitude variation is low (CC in FIG. 3(c)). To improve the capability of the median filter to suppress the influence of the small amplitude variation, the number of the data to be used for calculating the median value (center value) needs to be increased. If the number of data is increased, the capability to track the step-shaped behavior may deteriorate.

When the $\epsilon$ filter is used (FIG. 3(d)), the capability to track the step-shaped behavior is very high, and no delay is caused (BB in FIG. 3(d)). However, the capability of suppressing the influence of the small amplitude variation and/or the impulse-like behavior is very low (AA in FIG. 3(d)).

When the nonlinear filter 20 (the moving average filter+the $\epsilon$ filter) is used (refer to (e) of FIG. 3), the impulse-like behavior is suppressed by the moving average filter. The $\epsilon$ filtering is applied to filtering values in a wider time interval than the time interval of the data used in the moving average filer. As a result, the high attenuation for the impulse-like behavior and small amplitude variation is realized while maintaining a high tracking capability to the step-shaped behavior.

When the nonlinear filter 20 (the median filter+the ε filter) is used (FIG. 3(f)), the impulse-like behavior is suppressed by the median filter. The ε filtering is applied to filtering values in a broader time interval than the time interval of the data used in the median filer. Accordingly, the high attenuation for the impulse-like behavior and/or the small amplitude variation is realized (CC in FIG. 3(f)) while maintaining a high tracking capability to the step-shaped behavior (BB in FIG. 3(f)).

When nonlinear filters (e) and (f) are compared, (f) is advantageous in terms of the tracking capability to the step-shaped behavior and (e) is advantageous in terms of the attenuation capability for the impulse-like behavior and/or the small amplitude variation.

Accordingly, it can be understood that the combination of the filters applied in this embodiment of the invention makes effective use of the advantages of each filer while compensating for the shortcomings of each filter.

Figure 4:
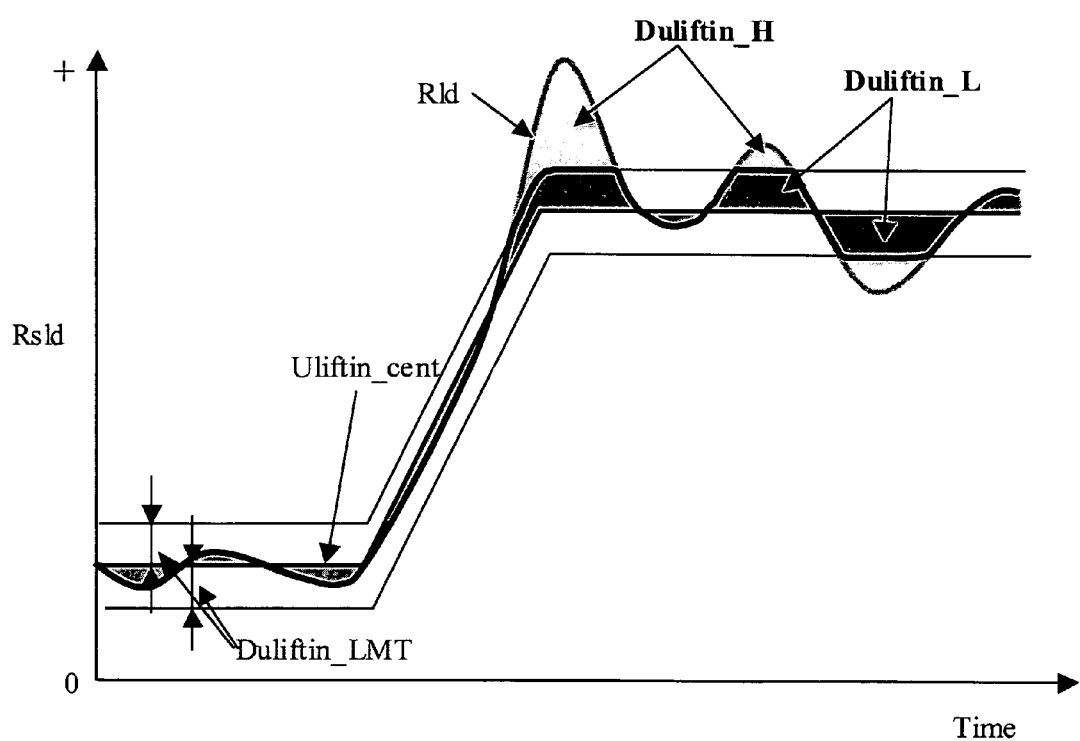
FIG. 4 schematically shows a relation between low variation component and high variation component relative to a reference input.

1.3 Calculation of Low Variation Component Duliftin_L and High Variation Component Dliftin_H FIG. 4 shows a relation of a low variation component Duliftin_L and a high variation component Dliftin_H relative to a reference input. A center value component Uliftin_cent regarding the reference input is first calculated and a difference Dliftin between the center value component and the reference input is obtained. Then, from the difference Dliftin, the input signal component within a predetermined dividing threshold value Duliftin_LMT is extracted as a low variation component Duliftin_L. The signal component exceeding the predetermined dividing threshold value is extracted as a high variation component Dliftin_H.

In this embodiment, the low variation component Duliftin_L and the high variation component Dliftin_H are calculated according to Equation (7) through Equation (9).

$$Duliftin(k) = Rsld(k) - Uliftin\_cent(k) \quad (7)$$

$$Duliftin\_L(k) = \begin{cases} Duliftin\_LMT & (Duliftin(k) < Duliftin\_LMT) \\ Duliftin(k) & (-Duliftin\_LMT \le Duliftin(k) \le Duliftin\_LMT) \\ -Duliftin\_LMT & (Duliftin(k) < -Duliftin\_LMT) \end{cases} \quad (8)$$

$$Duliftin\_H(k) = \begin{cases} Duliftin(k) - Duliftin\_LMT & (Duliftin(k) < Duliftin\_LMT) \\ 0 & (-Duliftin\_LMT \le Duliftin(k) \le Duliftin\_LMT) \\ Duliftin(k) + Duliftin\_LMT & (Duliftin(k) < -Duliftin\_LMT) \end{cases} \quad (9)$$

1.4 Calculation of ΔΣ-modulated Low Variation Component Duliftin_L_DSM

Subsequently, the low variation component Duliftin_L among the divided components is modulated by the ΔΣ modulation algorithm, and ΔΣ-modulated low variation component Duliftin_L_DSM is calculated. Details of calculation of the ΔΣ-modulated low variation component are as follows.

As shown in Equation (10), low variation component Duliftin_L is used as an input value r(k) to the ΔΣ modulation without pre-processing. A pre-processing such as a limiting process or an offset process is usually performed for the ΔΣ modulation. The low variation component Duliftin_L is in effect pre-processed in that it has been extracted within the range of the dividing threshold value (±Duliftin_LMT).

$$r(k) = Duliftin\_L(k) \quad (10)$$

Next, as shown in Equation (11), a deviation δ(k) between the input value r(k) and the modulation signal u(k−1) at the previous time k−1 is calculated. Then, as shown in Equation (12), the deviation signal δ(k) is added to the deviation integral value σ(k−1) at the previous time k−1 so as to obtain a deviation integral value σ(k).

$$\delta(k) = r(k) - u(k-1) \quad (11)$$

$$\sigma(k) = \sigma(k-1) + \delta(k) \quad (12)$$

Then, as shown in Equation (13), a nonlinear function fnl is applied to the deviation integral value σ(k) to obtain a binary value of +R or −R. More specifically, when the deviation integral value σ(k) is equal to or larger than zero, the nonlinear function fnl outputs a modulation signal u(k) of +R and when the deviation integral value σ(k) is smaller than zero, the nonlinear function outputs a modulation signal of −R. Here, R represents a predetermined value that is larger than the maximum absolute value of the input value r. Besides, the nonlinear function fnl may output zero as a modulation signal when the deviation integral value σ(k) is zero. Subsequently, as shown in Equation (14), the modulation signal u(k) is output as a modulated low variation component Duliftin_L_DSM.

$$u(k) = fnl(\sigma(k)) \quad (13)$$

$$Duliftin\_L\_dsm(k) = u(k) \quad (14)$$

1.5 Variable Lift Mechanism Control System

Figure 5:
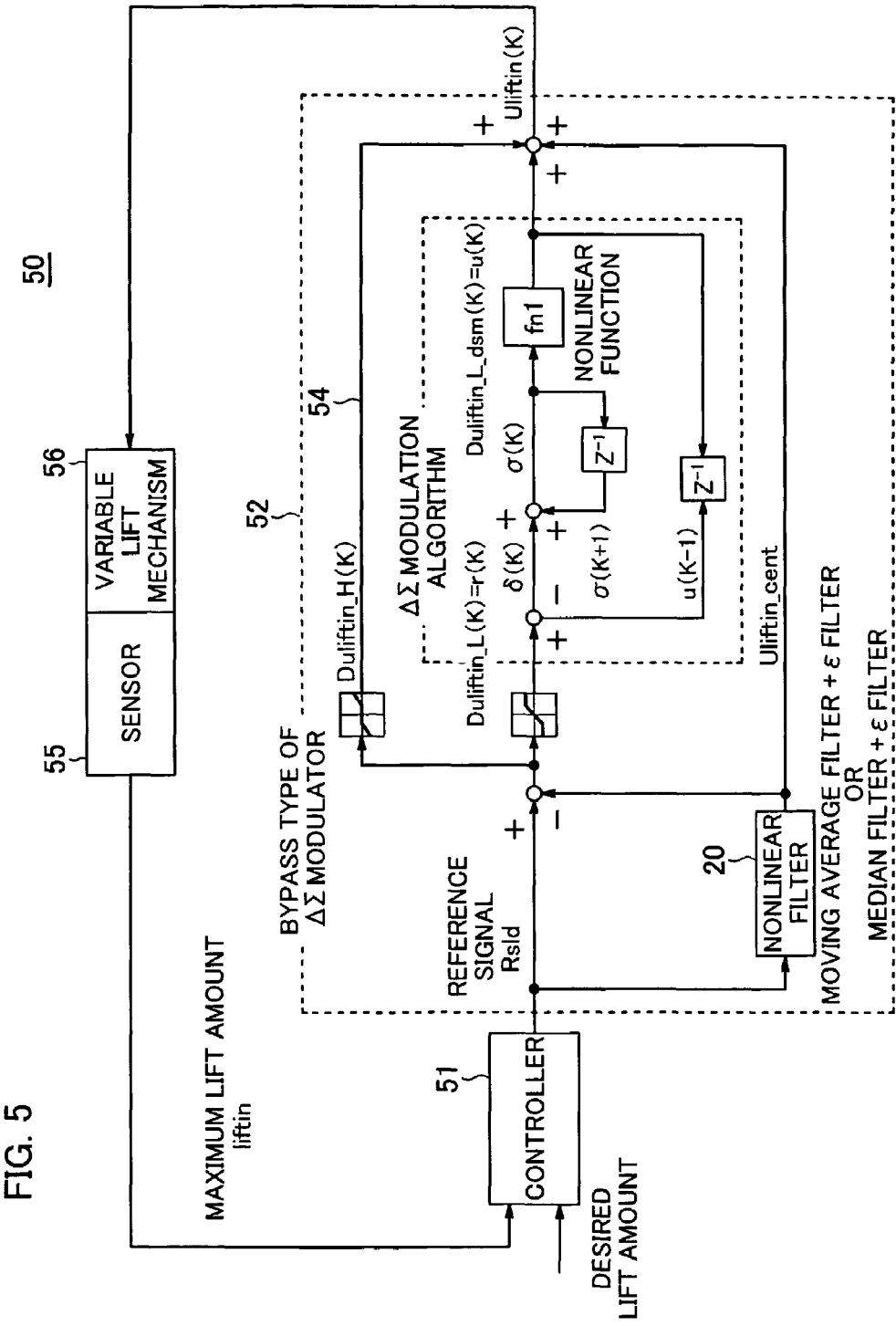
FIG. 5 is a block diagram of a variable lift mechanism control system in which a bypass type $\Delta\Sigma$ modulator is applied.

FIG. 5 is a block diagram of a variable lift mechanism control system 50 that includes a bypass type ΔΣ modulator 52.

First, a desired lift amount and a measured value liftin are input to a controller 51. This measured value is a maximum lift amount that is measured by a conventional method using a sensor 55 disposed in a variable lift mechanism 56. The controller calculates a reference input Rsld which is a correction amount to be used to resolve an error. Next, the reference input Rsld is input to the bypass type ΔΣ modulator 52, in which a center value component Uliftin_cent is extracted by a nonlinear filter 20.

Subsequently, a difference between the reference input Rsld and the center value component Uliftin_cent is divided into a low variation component Dliftin_L and a high variation component Dliftin_H by using a threshold value. Then, a calculation by a ΔΣ modulation algorithm 54 is performed upon the low variation component Dliftin_L, and a ΔΣ-modulated low variation component Dliftin_L_dsm is calculated. Finally, the ΔΣ-modulated low variation component is integrated with the center value component and the high variation component, and a control input Uliftin is generated.

It should be noted that the modulator may be constructed by using a Δ modulation algorithm 64 or a ΔΣ modulation algorithm 74 although the above-described system uses the ΔΣ modulation algorithm 54.

Figure 6:
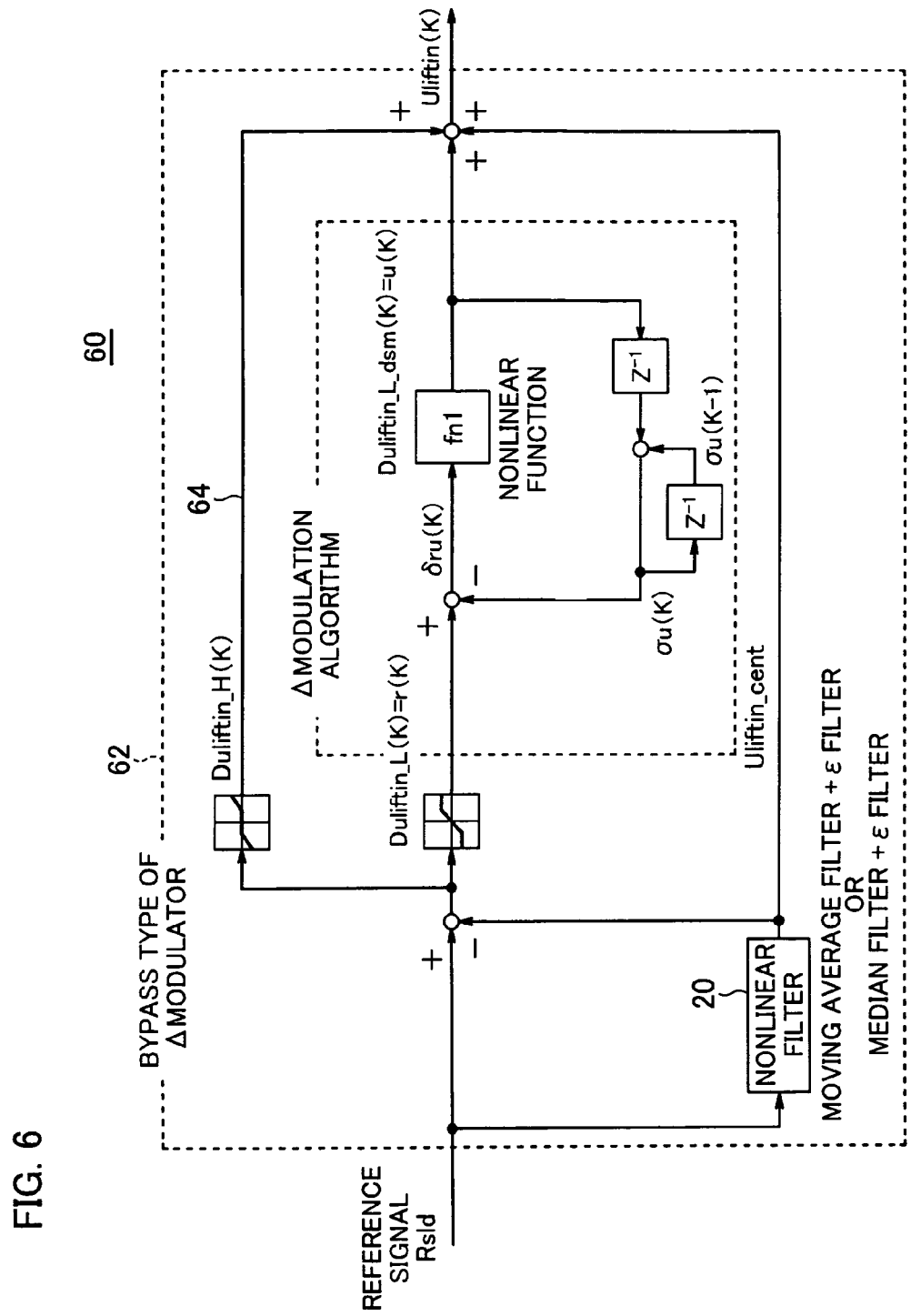
FIG. 6 is block diagram of a bypass type $\Delta$ modulator.

FIG. 6 is a block diagram of a variable lift mechanism control system 60 in which the Δ modulation algorithm 64 is applied. Operations performed by the Δ modulation algorithm 64 are as shown in Equation (15) through Equation (19).

$$r(k)=Duliftin\_L(k) \quad (15)$$

$$\sigma u(k)=\sigma u(k-1)+u(k-1) \quad (16)$$

$$\delta ru(k)=r(k)-\sigma u(k) \quad (17)$$

$$u(k)=fnl(\delta ru(k)) \quad (18)$$

$$Duliftin\_L\_dsm(k)=u(k) \quad (19)$$

Figure 7:
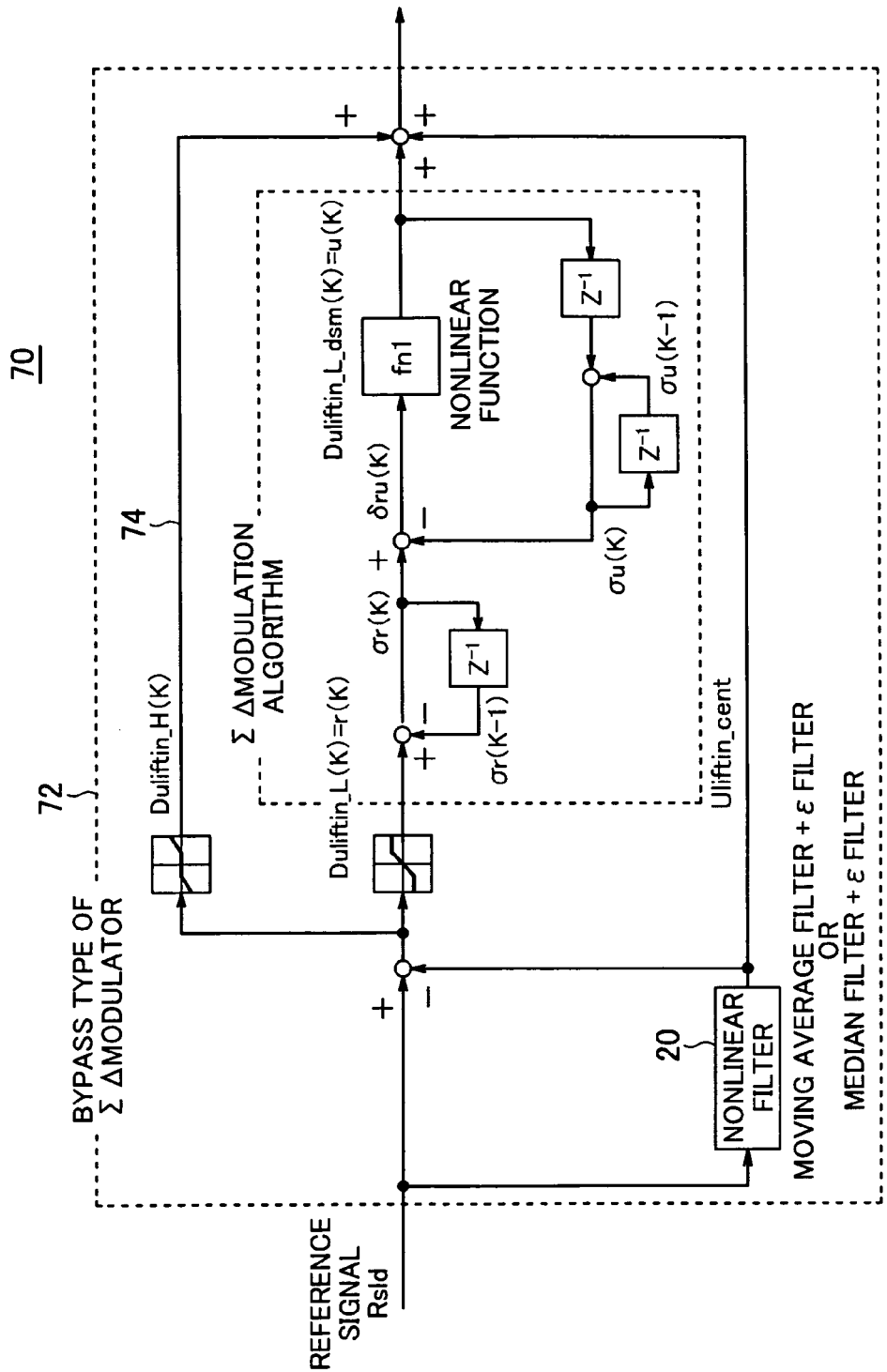
FIG. 7 is a block diagram of a bypass type $\Delta\Sigma$ modulator.

FIG. 7 is a block diagram of a variable lift mechanism control system 70 in which the ΣΔ modulation algorithm 74 is applied. Operations performed by the ΣΔ modulation algorithm 74 are as shown in Equation (20) through Equation (24).

$$r(k)=Duliftin\_L(k) \quad (20)$$

$$\sigma r(k)=\sigma r(k-1)+r(k) \quad (21)$$

$$\sigma u(k)=\sigma u(k-1)+u(k-1) \quad (22)$$

$$\delta ru(k)=\sigma r(k)-\sigma u(k) \quad (23)$$

$$Duliftin\_L\_dsm(k)=u(k) \quad (24)$$

2. Application to other controlled objects

Conventional modulation algorithms such as a ΔΣ modulation have a problem that those algorithms may generate a vibration as for controlled objects having a large variation in controlled variables though those algorithms have a high capability of compensating a nonlinear property. The bypass type modulation algorithm in accordance with the present invention can be applied even to such controlled objects. In other embodiments of the present invention, the bypass type modulation algorithm is applied to other controlled objects than the variable lift mechanism, which had problems with conventional modulation algorithms.

Figure 8:
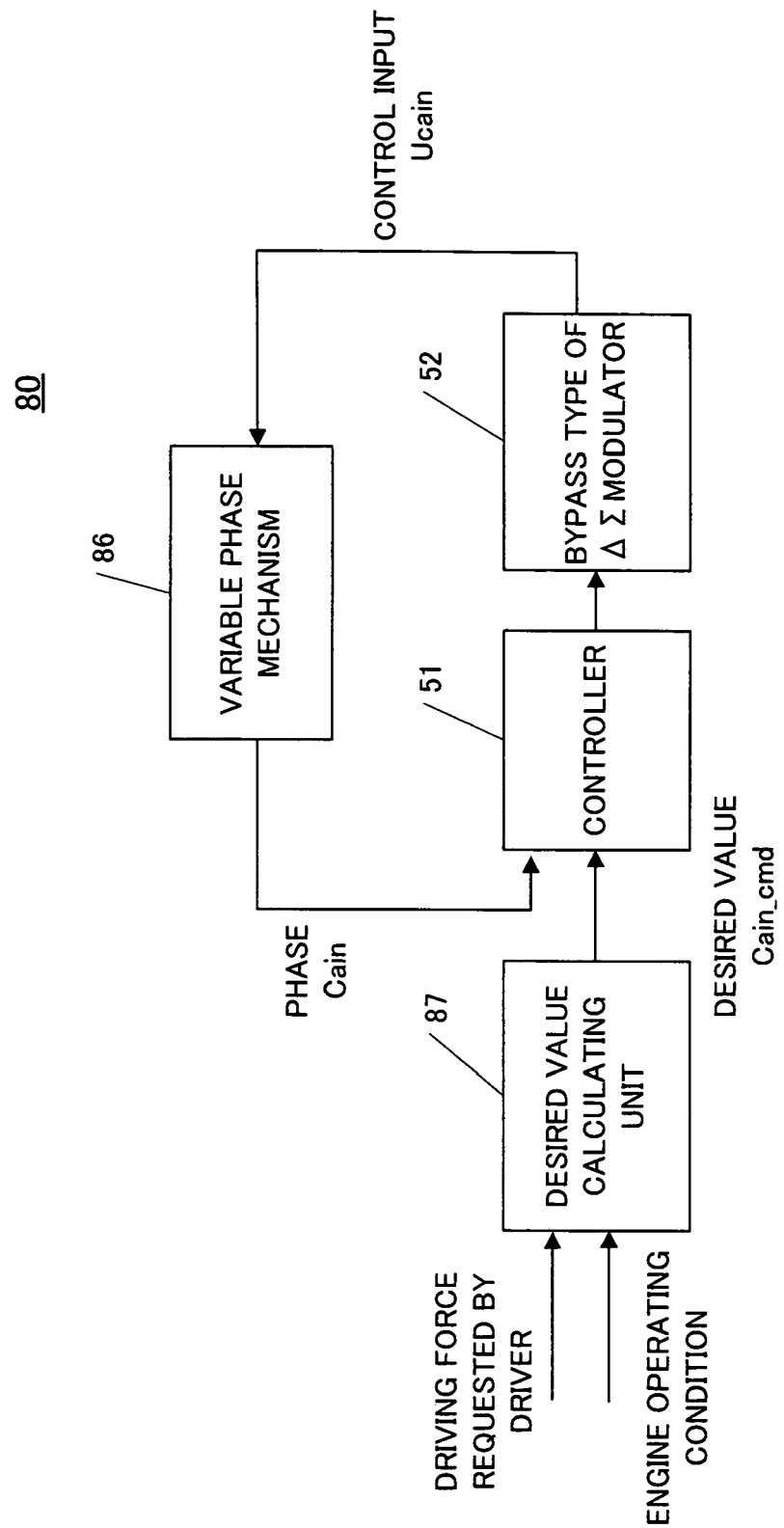
FIG. 8 is a block diagram of a system in which a bypass type $\Delta\Sigma$ modulator is applied to a variable phase mechanism.

FIG. 8 is a block diagram of a control system 80 in which the bypass type ΔΣ modulator 52 is applied to a variable phase mechanism 86. The variable phase mechanism 86 controls valve timing by changing a cam phase Cain by the use of oil pressure, an electromagnetic brake and so on. In this system 80, controllability for the phase Cain is improved as compared with conventional modulators because the hysteresis characteristic of the oil hydraulic solenoid and/or the electromagnetic brake as well as low control resolution is compensated by the modulation input while making the modulation range smaller.

Figure 9:
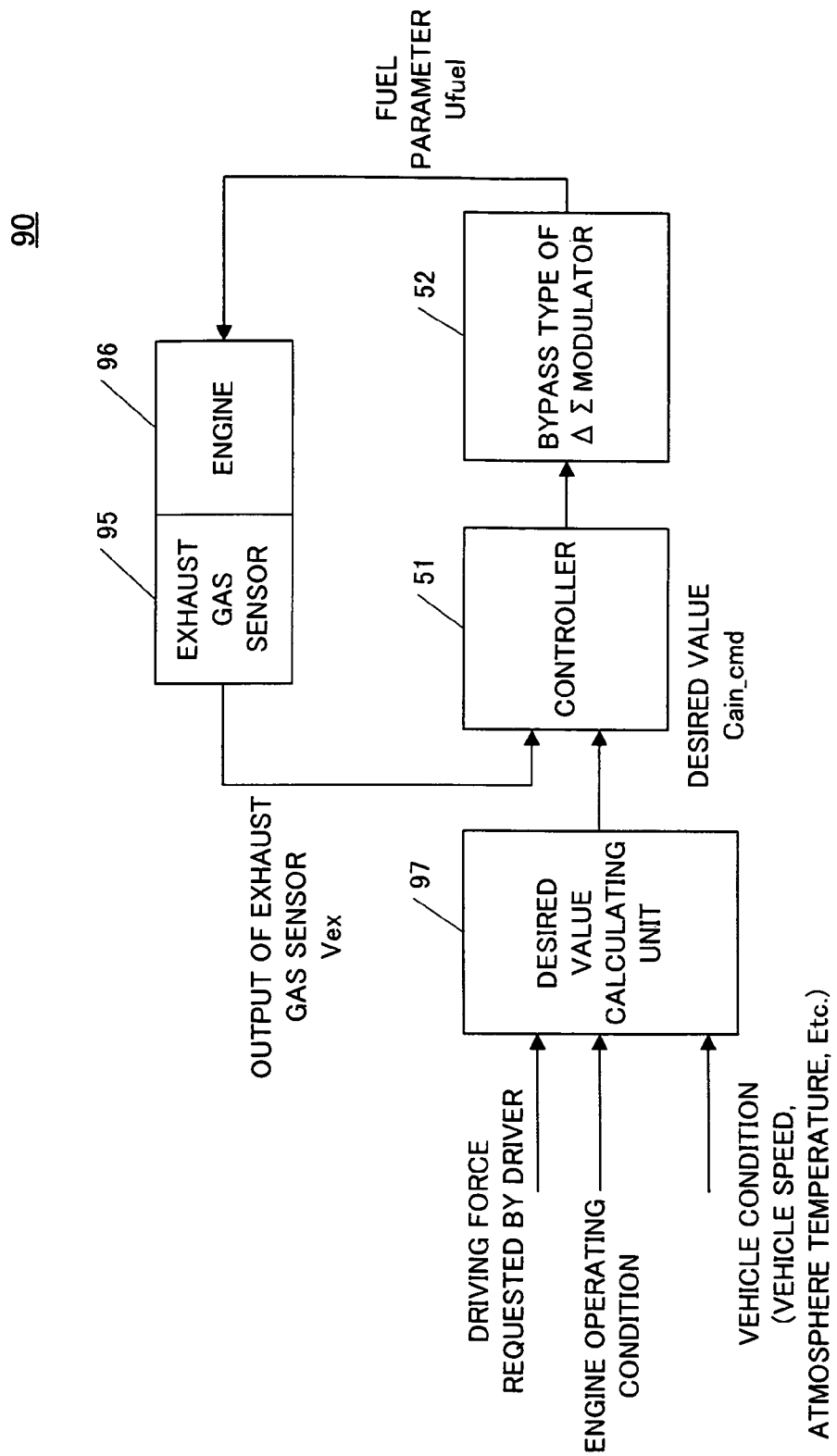
FIG. 9 is block diagram of a system in which a bypass type $\Delta\Sigma$ modulator is applied to an air/fuel ratio control.

FIG. 9 is a block diagram of a control system 90 in which the bypass type ΔΣ modulator 52 is applied to an air/fuel ratio control. The air/fuel ratio control system controls an output Vex of an exhaust gas sensor 95 disposed in an exhaust system on a desired value Vex_cmd by adjusting a fuel parameter Ufuel (for example, a fuel correction amount). According to this system, a response delay and/or certain dispersion of an engine 96 and/or a catalytic converter can be compensated and the exhaust gas sensor output Vex can be precisely controlled to a desired value so that harmful constituents contained in the exhaust gas decrease. Moreover, by making a variation range of fuel parameters (which is the control input) small, variation of the combustion of engine 96 becomes smaller and unburned HC (hydrocarbon) reduces.

Figure 10:
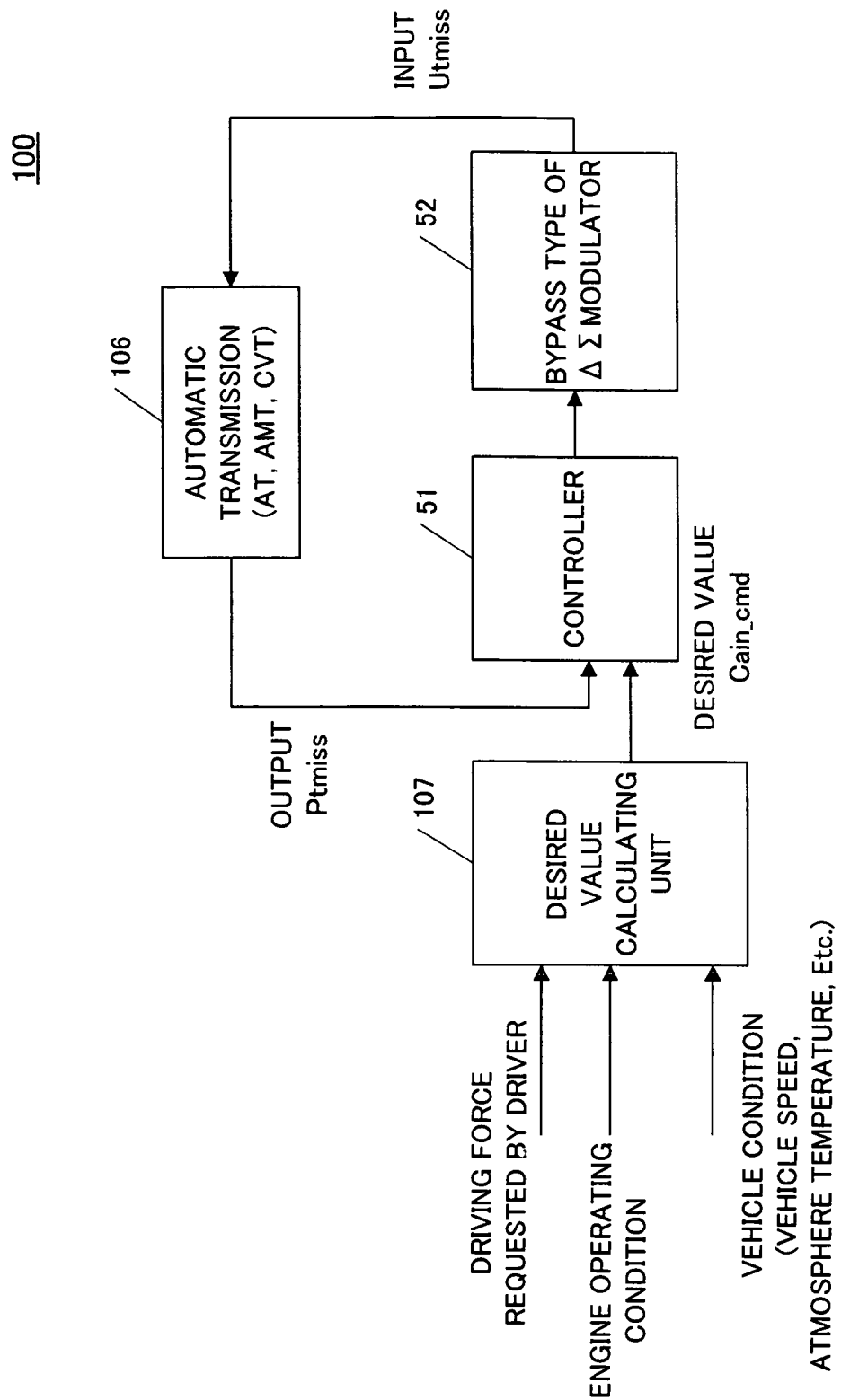
FIG. 10 is a block diagram of a system in which a bypass type $\Delta\Sigma$ modulator is applied to an actuator control for an automatic transmission.

FIG. 10 is a block diagram of a system 100 in which the bypass type ΔΣ modulator 52 is applied to an actuator control for an automatic transmission mechanism. The actuator control for the automatic transmission mechanism includes a clutch control for the AMT (automatic manual transmission) and/or an oil pressure control for the shift, a positioning control for an electrically-driven actuator, a control for engagement, disengagement, or slipping rate of a hydraulic multiple disc clutch of the AT (automatic transmission), a side pressure control for the belt type CVT (continuously-variable transmission) and so on. As for these controls, high controllability cannot be achieved readily due to the friction and/or hysteresis characteristic of the automatic transmission mechanism 106 and/or the actuator. However, by applying the bypass type ΔΣ modulator 52 as shown in FIG. 10, high controllability can be realized and fuel cost efficiency (mileage) can be improved because of the reduction of the shift shock at gear change time and improvement of transfer efficiency.

Although the systems shown in FIG. 8 through FIG. 10 use the bypass type ΔΣ modulator 52 as a modulator, the bypass type Δ modulator 62 or the bypass type ΣΔ modulator 72 may be alternatively used. The invention has been described relative to specific embodiments. The specification is not intended to limit the invention to such embodiments.

The invention claimed is:

1. A plant controller using a modulation algorithm, the controller comprising:
   means for providing a preliminary control input to be used for controlling an output of the plant to a desired value;
   means for dividing the preliminary control input into a plurality of components;
   means for modulating at least one of the plurality of components; and
   means for adding the modulated component to the other components to generate a control input.

2. The plant controller as claimed in claim 1, wherein said plurality of components include:
   a first component extracted by filtering the preliminary control input; and
   a second component extracted from a difference between the preliminary control input and the first component, said second component being within a predetermined range of absolute values; and
   wherein said means for modulating modulates the second component.

3. The plant controller as claimed in claim 2, wherein said filtering is performed by a linear filter or a median filter.

4. The plant controller as claimed in claim 3, wherein said filtering is further performed by a ε filter.

5. The plant controller as claimed in claim 2, wherein said filtering is performed by a ε filter.

6. The plant controller as claimed in claim 1, wherein said means for modulating uses an algorithm selected from a group comprising a ΔΣ modulation algorithm, a ΣΔ modulation algorithm and a Δ modulation algorithm.

7. A controller for a variable lift mechanism of an internal-combustion engine, the controller using a modulation algorithm and comprising:
   means for providing a preliminary control input to be used for controlling a maximum lift amount of the variable lift mechanism to a desired lift amount;
   means for dividing the preliminary control input into a plurality of components;

means for modulating at least one of the plurality of components; and means for adding the modulated component to the other components to generate a control input.

8. A controller for a variable phase mechanism of an internal-combustion engine, the controller using a modulation algorithm and comprising:

means for providing a preliminary control input to be used for controlling a cam phase of the variable phase mechanism to a desired phase;

means for dividing the preliminary control input into a plurality of components;

means for modulating at least one of the plurality of components; and means for adding the modulated component to the other components to generate a control input.

9. An air/fuel ratio controller of an internal-combustion engine, the controller using a modulation algorithm and comprising:

means for providing a preliminary control input to be used for controlling an output of an exhaust gas sensor on a desired value;

means for dividing the preliminary control input into a plurality of components;

means for modulating at least one of the plurality of components; and means for adding the modulated component to the other components to generate a control input.

10. A controller for an automatic transmission mechanism of an internal-combustion engine, the controller using a modulation algorithm and comprising:

means for providing a preliminary control input to be used for controlling an output position of the automatic transmission mechanism on a desired position;

means for dividing the preliminary control input into a plurality of components;

means for modulating at least one of the plurality of components; and means for adding the modulated component to the other components to generate a control input.

11. A method for controlling a plant, comprising:

providing a preliminary control input to be used for controlling an output of the plant to a desired value;

dividing the preliminary control input into a plurality of components;

modulating at least one of the plurality of components; and adding the modulated component to the other components to generate a control input.

12. The method of claim 11, wherein said plant is an internal combustion engine.

* * * * *